(12) United States Patent
Xu et al.

(10) Patent No.: US 11,392,747 B2
(45) Date of Patent: Jul. 19, 2022

(54) LAYOUT METHOD OF A SEMICONDUCTOR DEVICE AND ASSOCIATED SYSTEM

(71) Applicant: TAIWAN SEMICONDUCTOR MANUFACTURING COMPANY LTD., Hsinchu (TW)

(72) Inventors: Jin-Wei Xu, Hsinchu (TW); Hui-Zhong Zhuang, Kaohsiung (TW); Chih-Liang Chen, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 16/875,139

(22) Filed: May 15, 2020

(65) Prior Publication Data

US 2021/0133386 A1    May 6, 2021

Related U.S. Application Data

(60) Provisional application No. 62/928,182, filed on Oct. 30, 2019.

(51) Int. Cl.
*G06F 30/392* (2020.01)
*G06F 30/3953* (2020.01)
*G06F 117/04* (2020.01)

(52) U.S. Cl.
CPC ........ *G06F 30/3953* (2020.01); *G06F 30/392* (2020.01); *G06F 2117/04* (2020.01)

(58) Field of Classification Search
CPC . G06F 30/3953; G06F 30/392; G06F 2117/04
See application file for complete search history.

(56) References Cited

U.S. PATENT DOCUMENTS

| 6,305,004 B1 * | 10/2001 | Tellez | G06F 30/394 716/129 |
| 10,095,824 B1 * | 10/2018 | Li | G06F 30/394 |
| 2011/0161901 A1 * | 6/2011 | Berry | G06F 30/394 716/108 |
| 2017/0316143 A1 * | 11/2017 | Lu | G06F 30/394 |

FOREIGN PATENT DOCUMENTS

WO    WO-0171808 A1 *  9/2001    ............. G06F 30/39

* cited by examiner

*Primary Examiner* — Nghia M Doan
(74) *Attorney, Agent, or Firm* — WPAT, P.C., Intellectual Property Attorneys; Anthony King

(57) ABSTRACT

A layout method of a semiconductor device is disposed. The layout method includes: disposing a first metal strip directed to a first clock signal and disposing a first block strip parallel with the first metal strip, wherein the first block strip is indicative of a first blockage which prevents a routing tool from placing another metal strip on the location of the first block strip.

20 Claims, 19 Drawing Sheets

US 11,392,747 B2

LAYOUT METHOD OF A SEMICONDUCTOR DEVICE AND ASSOCIATED SYSTEM

CROSS-REFERENCE TO RELATED APPLICATION

This application claims the benefit of U.S. Provisional Application No. 62/928,182, filed on Oct. 30, 2019, which is incorporated by reference in its entirety.

BACKGROUND

The semiconductor integrated circuit (IC) industry has experienced exponential growth. Technological advances in IC materials and design have produced generations of ICs, where each generation has smaller and more complex circuits than the previous generation. In the course of IC evolution, functional density (e.g., the number of interconnected devices per chip area) has generally increased while geometry size (e.g., the smallest component or line that can be created using a fabrication process) has decreased. With such small size, the space between two signal lines is decreased, and the noise resulting from one signal line to the other inevitably increases. However, for a signal line carrying a clock signal, the noise is undesired.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
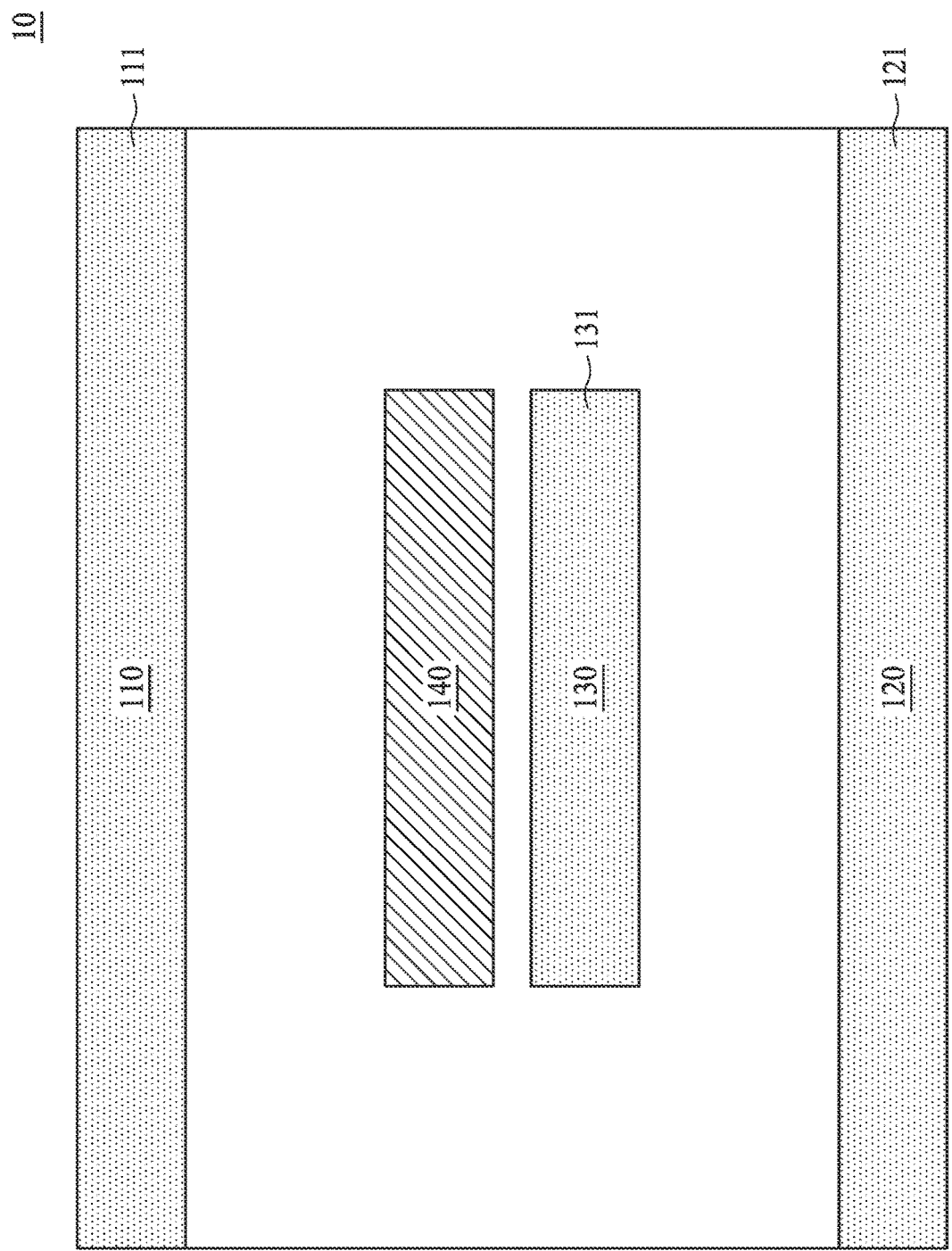
FIG. 1 is a diagram illustrating a cell in accordance with an embodiment of the present disclosure.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Place and route is a stage in the design of printed circuit boards (PCBs), integrated circuits (ICs), and field-programmable gate arrays (FPGAs). As implied by the name, it is composed of two steps, placement and routing. The first step, placement, involves deciding where to place all electronic components, circuitry, and logic elements in a generally limited amount of space. This is followed by routing, which decides the exact design of all the wires needed to connect the placed components. This step must implement all the desired connections while following the rules and limitations of the manufacturing process.

For ICs, when the place and route stage is executed, a layout of a larger block of the circuit or the whole circuit is created from layouts of smaller sub-blocks. Specifically, the place and route stage in ICs typically starts with one or more schematics, HDL files, or pre-routed IP cores, or some combination of all three. It produces an IC layout that is automatically converted to a mask work in the standard GDS II or the OASIS format.

In some embodiments, the place and route stage further involves a clock tree synthesis stage which is a process which makes sure that the clock signal gets distributed evenly to all sequential elements in a design. In some embodiments, the flow goes by the placement stage, the clock tree synthesis stage, and the signal routing stage.

When a signal line carrying a clock signal and another signal line are placed too close, the clock signal is affected by the signal coupling effect resulting from the capacitor formed between two signal lines. This phenomenal is hard to ignore when the size of the semiconductor device decreases, which makes the space between two signal lines decrease inevitably, and the capacitor formed between two signal lines is enlarged.

FIG. 1 is a diagram illustrating a layout of a cell 10 in accordance with an embodiment of the present disclosure. In this embodiment, the cell 10 is a standard cell integrated in a semiconductor device. For example, the cell 10 is an inverter, an NAND gate, an NOR gate, or a multiplexer etc. The layout of the cell 10 includes metal strips 110, 120, and 130. The metal strips 110, 120 and 130 extend in x direction. In this embodiment, each of the metal strips 110 and 120 is directed to a voltage source. For example, the metal strip 110 is directed to a reference voltage source VDD 111, and the metal strip 120 is directed to a ground voltage 121. The metal strip 130 is directed to a clock signal 131.

Figure 2:
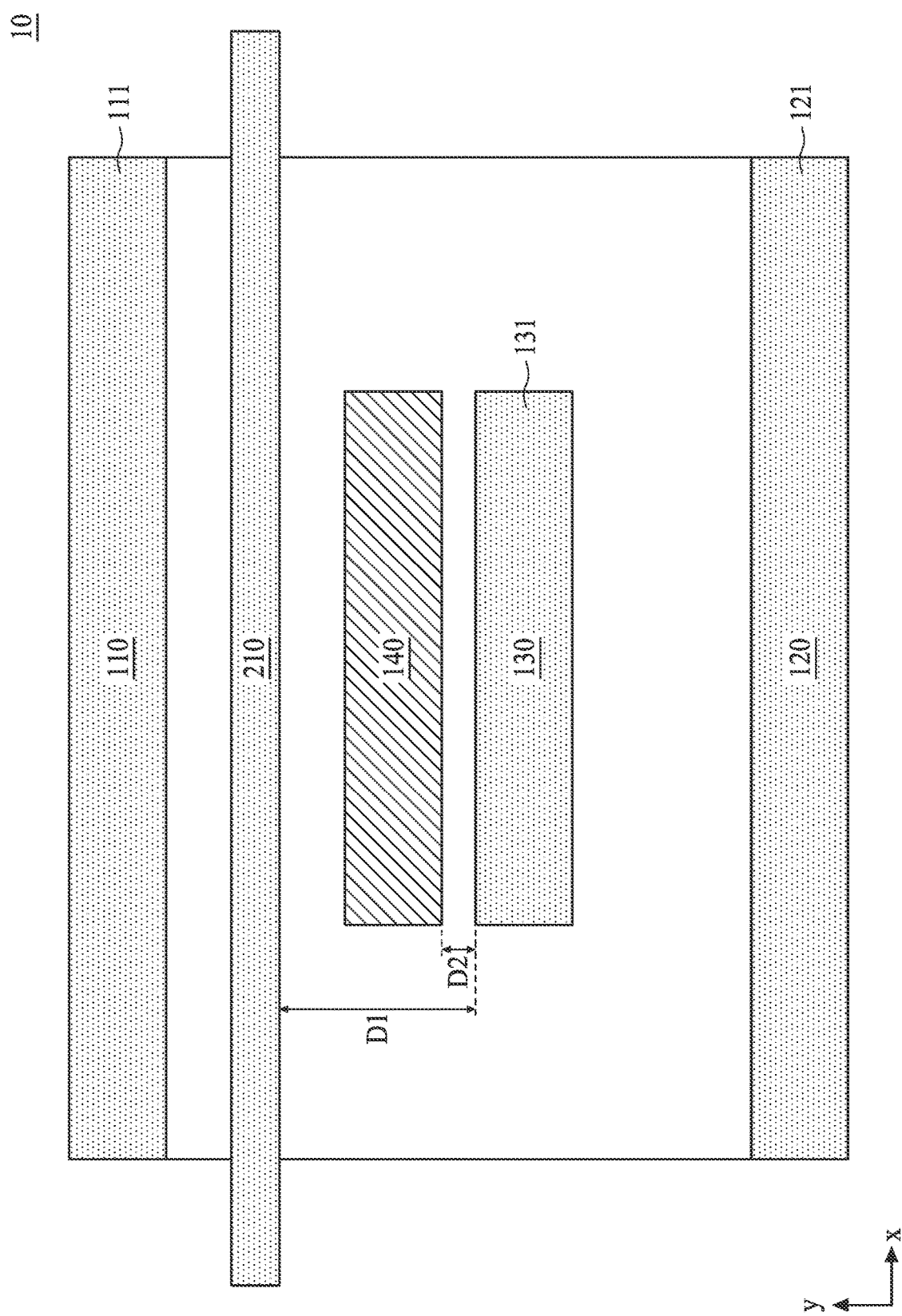
FIG. 2 is a diagram illustrating the cell after the routing stage in accordance with an embodiment of the present disclosure.

The cell 10 further includes a block strip 140 parallel with the metal strip 130, wherein the block strip 130 is indicative of a blockage. Specifically, when a routing tool receives the layout of the cell 10, the block strip 140 prevents the routing tool from placing another metal strip on the location of the block strip 140. Refer to FIG. 2, which is a diagram illustrating the layout of the cell 10 after the routing stage in accordance with an embodiment of the present disclosure. As shown in FIG. 2, when the routing tool receives the layout of the cell 10, the routing tool places the metal strips without placing any on the location of the block strip 10. For example, the routing tool places a metal strip 210 farther away from the metal strip 130 in y direction.

Those skilled in the art should understand that a capacitor C formed between two metal plates can be written as $C=\varepsilon A/D$, wherein $\varepsilon$ is permittivity, D is the distance between the metal plates, and A is the area of the metal plates Therefore, when the metal strip 210 is placed farther in y direction instead of being placed on the location of the block strip 140, the distance between the metal strip 210 and the metal strip 130 is lengthened (from D2 to D1). With such configurations, the capacitor formed between the metal strip 210 and the metal strip 130 is shrunk, the coupling effect is reduced, and the noise resulting from the coupling effect decreased.

In this embodiment, the metal strip 130 is formed in a layer indicative of a M1 layer. Those skilled in the art should understand that, to reduce the noise resulting from another metal strip, the block strip 140 should locate in the same layer as the metal strip 130. In other words, the blockage represented by block strip 140 should be located in the layer indicative of the M1 layer as well, which prevents the routing tool from placing another metal strip on the location of the block strip 140 in the layer indicative of the M1 layer.

It should be noted that, however, the metal strips 110, 120 and 130 are not limited to be formed in the layer indicative of the M1 layer. In other embodiments, the metal strips 110, 120 and 130 are formed in different layers. In addition, the layout of the cell 10 may include more metal strip as the interconnection therein to implement the function of the cell 10. However, other metal strips are omitted in FIG. 1 and FIG. 2 for brevity.

Figure 3:
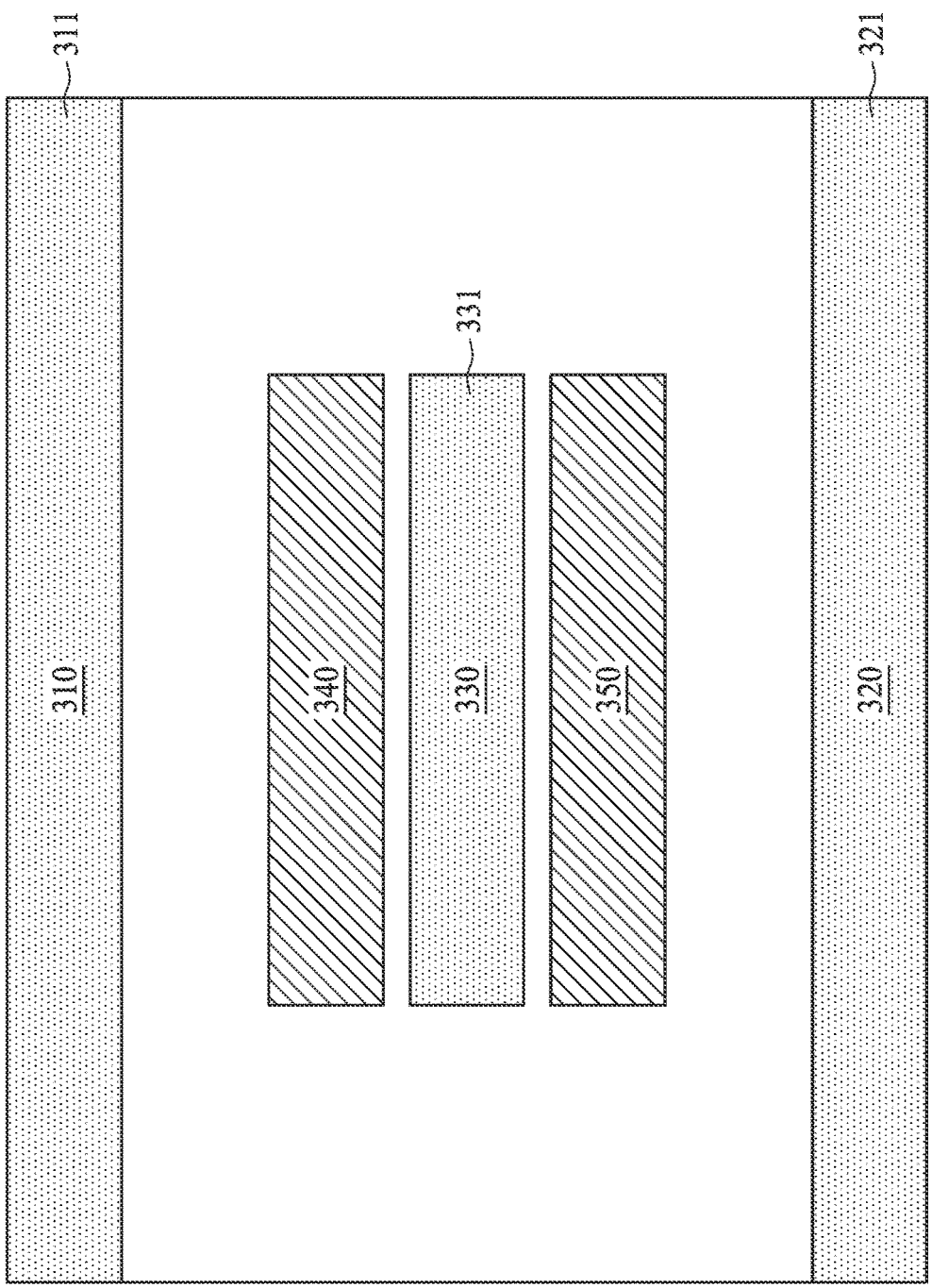
FIG. 3 is a diagram illustrating a cell in accordance with another embodiment of the present disclosure.

FIG. 3 is a diagram illustrating a layout of a cell 30 in accordance with an embodiment of the present disclosure. In this embodiment, the cell 30 is a standard cell integrated in a semiconductor device. For example, the cell 30 is an inverter, an NAND gate, an NOR gate, or a multiplexer etc. The layout of the cell 30 includes metal strips 310, 320, and 330. The metal strips 310, 320, and 330 extend in x direction. In this embodiment, each of the metal strips 310 and 320 is directed to a voltage source. For example, the metal strip 310 is directed to a reference voltage source VDD 311, and the metal strip 320 is directed to a ground voltage 321. The metal strip 330 is directed to a clock signal 331.

The cell 30 further includes block strips 340 and 350 parallel with the metal strip 330, wherein each of the block strips 340 and 350 is indicative of a blockage. Specifically, when a routing tool receives the layout of the cell 30, the block strip 340 and 350 prevent the routing tool from placing another metal strip on the locations of the block strips 340 and 350.

Figure 4:
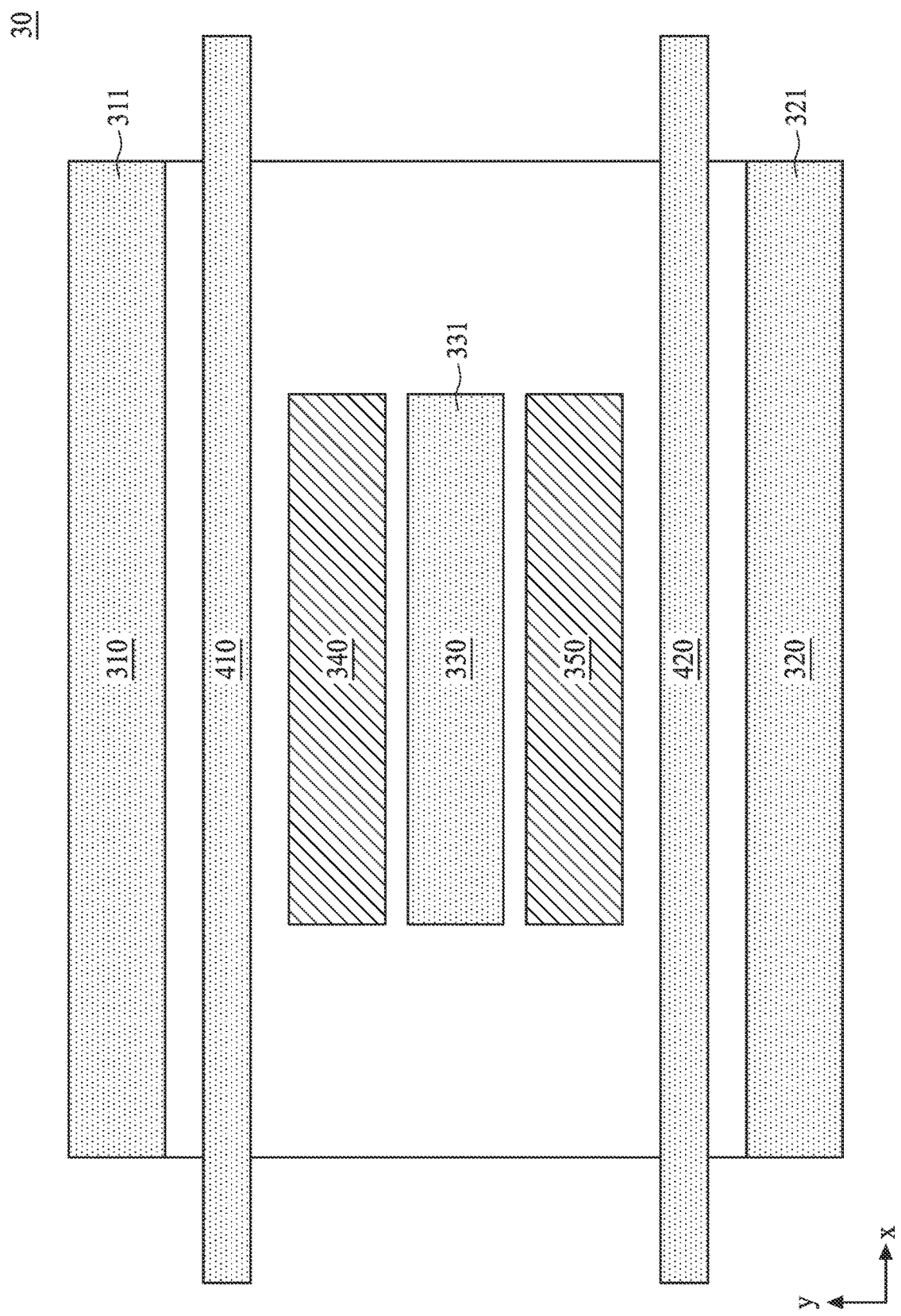
FIG. 4 is a diagram illustrating the cell after the routing stage in accordance with an embodiment of the present disclosure.

As mentioned in the embodiments of FIG. 1 and FIG. 2, with the existence of the block strips 340 and 350, the routing tool does not place any metal strips on the locations of the block strips 340 and 350. Therefore, the routing tool must place metal strips farther away from the metal strip 330 in y direction. Refer to FIG. 4, which is a diagram illustrating the layout of the cell 30 after the routing stage in accordance with an embodiment of the present disclosure. As shown in FIG. 4, when the routing tool receives the layout of the cell 30, the routing tool places the metal strips without placing any on the locations of the block strips 340 and 350. For example, the routing tool places a metal strip 410 between the block strip 340 and the metal strip 310. Because the metal strip 410 is placed farther in y direction instead of being placed on the location of the block strip 340, the capacitor formed between the metal strips 330 and 410 is shrunk, the coupling effect is reduced, and the noise resulting from the coupling effect decreased.

For another example, the routing tool places a metal strip 420 between the block strip 350 and the metal strip 320. Because the metal strip 420 is placed farther in y direction instead of being placed on the location of the block strip 350, the capacitor formed between the metal strips 330 and 420 is shrunk, the coupling effect is reduced, and the noise resulting from coupling effect decreased.

In this embodiment, the metal strip 330 is formed in the layer indicative of the M1 layer. Those skilled in the art should understand that, to reduce the noise resulting from another metal strip, the block strips 340 and 350 should be located in the same layer as the metal strip 330. In other words, the blockages represented by the block strips 340 and 350 should be located in the layer indicative of the M1 layer as well, which prevents the routing tool from placing another metal strip on the locations of the block strips 340 and 350 in the layer indicative of the M1 layer.

Figure 5:
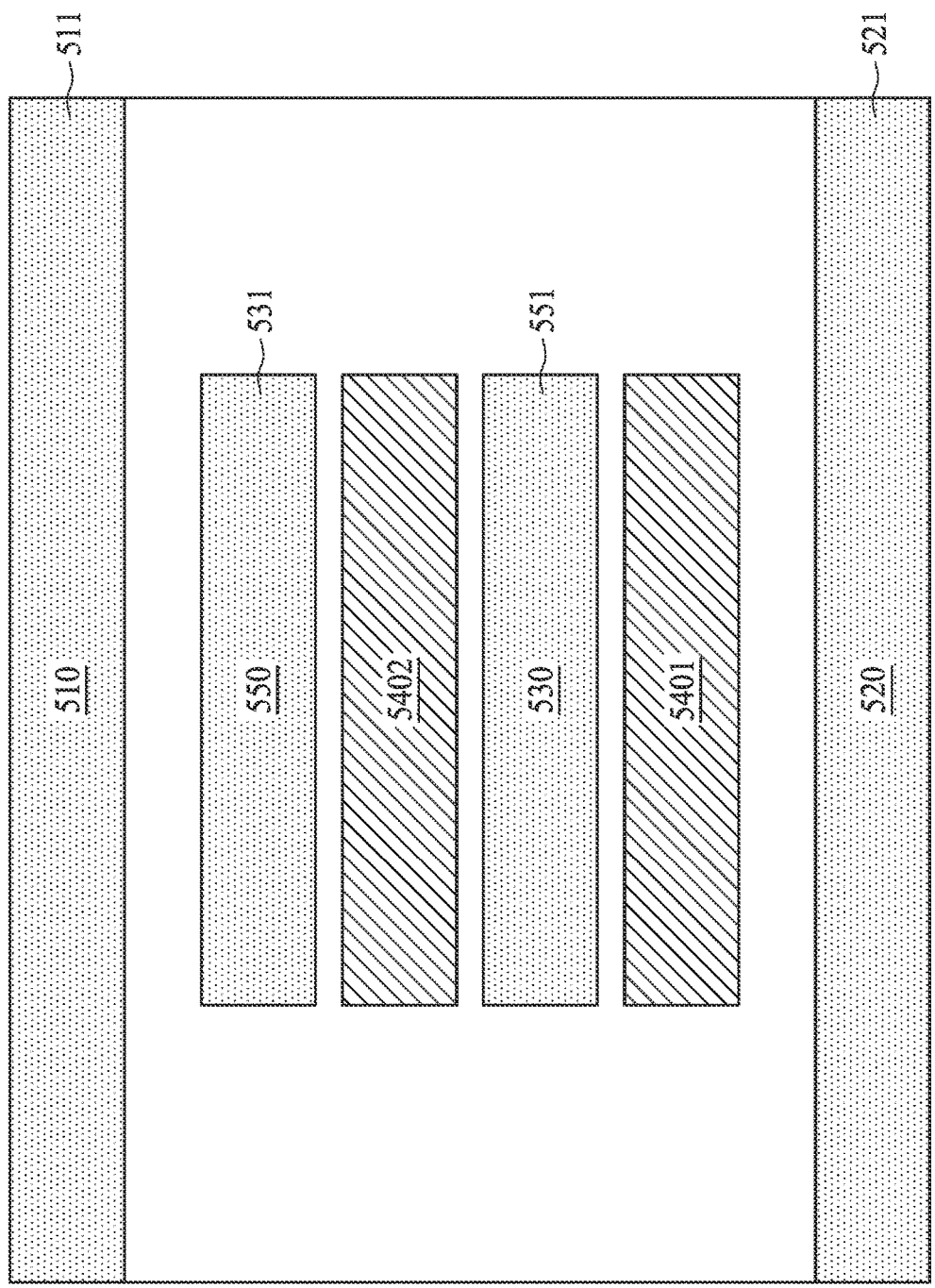
FIG. 5 is a diagram illustrating a cell in accordance with another embodiment of the present disclosure.

FIG. 5 is a diagram illustrating a layout of a cell 50 in accordance with an embodiment of the present disclosure. In this embodiment, the cell 50 is a standard cell integrated in a semiconductor device. For example, the cell 50 is an inverter, an NAND gate, an NOR gate, or a multiplexer etc. The layout of the cell 50 includes metal strips 510, 520, 530 and 550. The metal strips 510, 520, 530 and 550 extend in x direction. In this embodiment, each of the metal strips 510 and 520 is directed to a voltage source. For example, the metal strip 510 is directed to a reference voltage source VDD 511, and the metal strip 520 is directed to a ground voltage 521. Moreover, one of the metal strips 530 and 550 is directed to a clock signal, while the other is directed to another clock signal or an input/output signal, or is an interconnection line. In some embodiments, the metal strip 530 is directed to a first clock signal 531 while the metal strip 550 is directed to a second block signal 551, wherein the first clock signal 531 and the second clock signal 551 are complementary. In some embodiments, the second clock signal 551 is generated by inverting the first clock signal 531.

The cell 50 further includes block strips 5401 and 5402 parallel with the metal strips 530 and 550, wherein each of the block strips 5401 and 5402 are indicative of a blockage. Specifically, when a routing tool receives the layout of the cell 50, the block strips 5401 and 5402 prevent the routing tool from placing another metal strip on the locations of the block strips 5401 and 5402.

Figure 6:
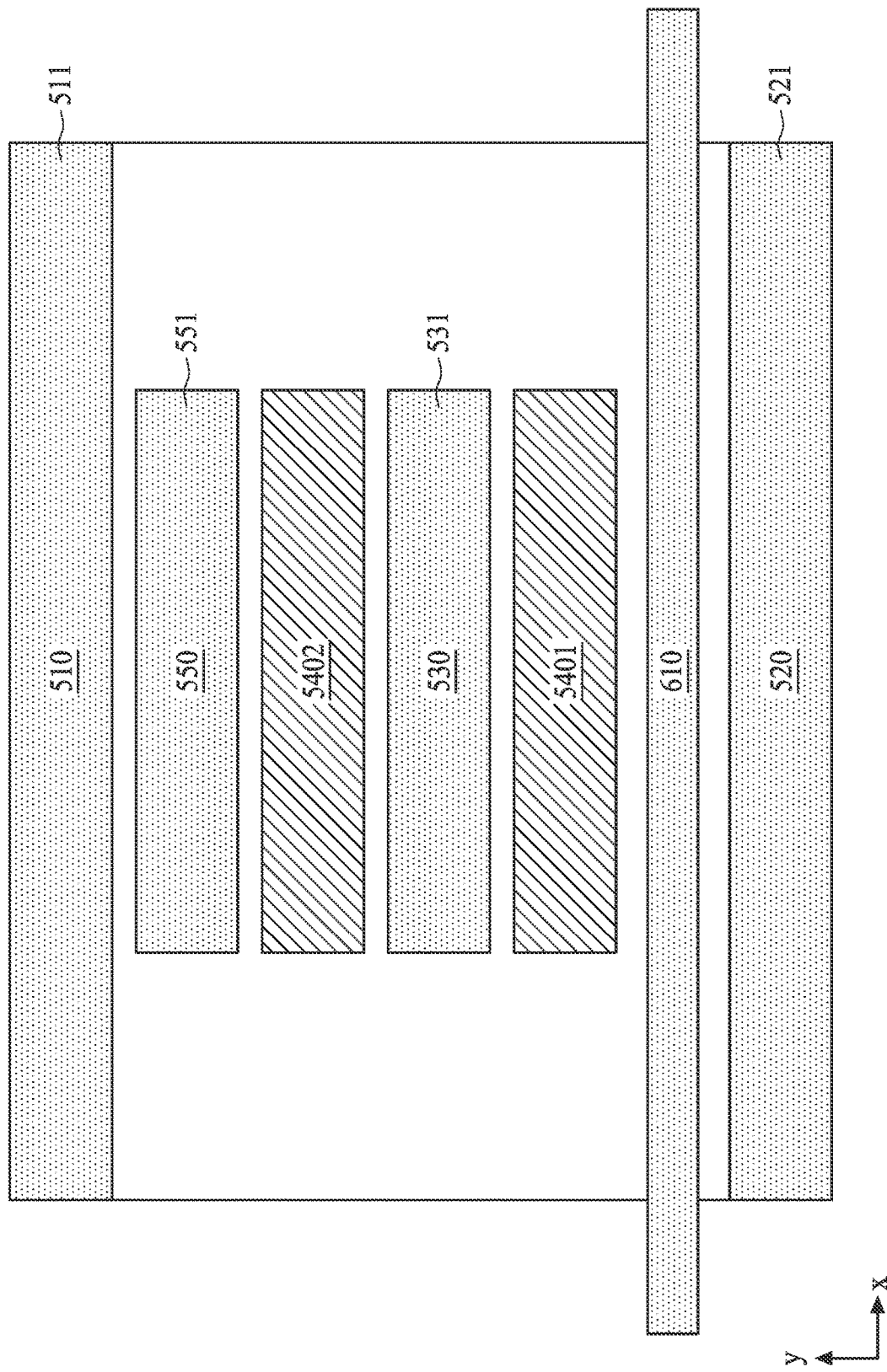
FIG. 6 is a diagram illustrating the cell after the routing stage in accordance with an embodiment of the present disclosure.

As mentioned in the embodiments of FIG. 1 and FIG. 2, with the existence of the block strips 5401 and 5402, the routing tool does not place any metal strip in the space between the metal strips 530 and 550. Therefore, the routing tool must place metal strips farther away from metal strips 530 and 550 in y direction. Refer to FIG. 6, which is a diagram illustrating the layout of the cell 50 after the routing stage in accordance with an embodiment of the present disclosure. As shown in FIG. 6, when the routing tool receives the layout of the cell 50, the routing tool places the metal strips without placing any on the location of the block strips 5401 and 5402. For example, the routing tool places a metal strip 610 between the metal strip 520 and the block strip 5401. Because the metal strip 610 is placed farther in y direction instead of being placed on the locations of the block strips 5401 and 5402, the capacitor formed between the metal strips 550 and 610 is shrunk, the coupling effect is reduced, and the noise resulting from the coupling effect decreased.

In this embodiment, the metal strips 530 and 550 are formed in a layer indicative of a M1 layer. Those skilled in the art should understand that, to reduce the noise resulting from another metal strip, the block strips 5401 and 5402 should be located in the same layer as the metal strip 530. In other words, the blockages represented by the block strips 5401 and 5402 should be located in the layer indicative of the M1 layer as well, which prevent the routing tool from placing another metal strip on the locations of the block strips 5401 and 5402 in the layer indicative of the M1 layer.

Figure 7:
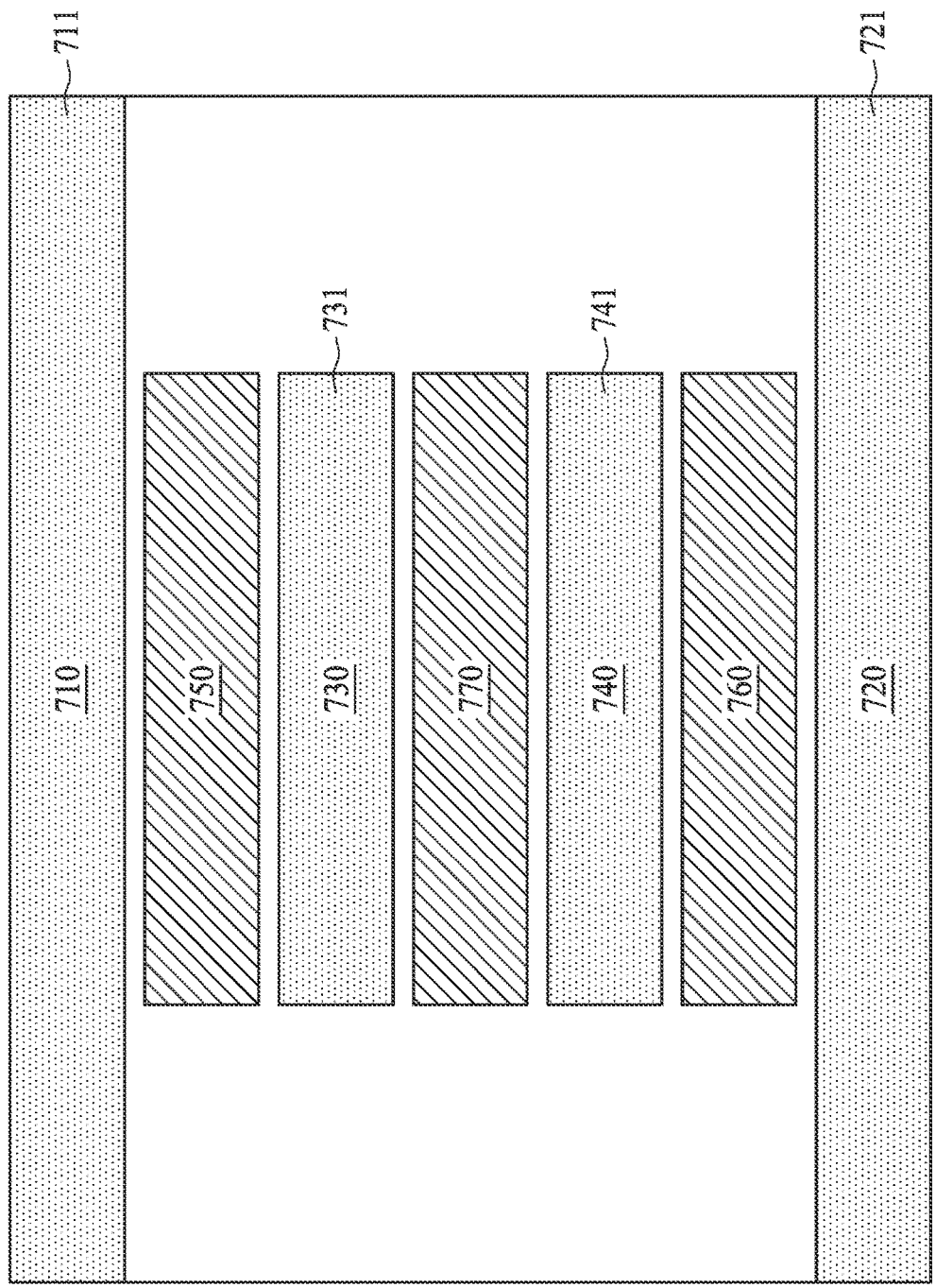
FIG. 7 is a diagram illustrating a cell in accordance with another embodiment of the present disclosure.

FIG. 7 is a diagram illustrating a layout of a cell 70 in accordance with an embodiment of the present disclosure. In this embodiment, the cell 70 is a standard cell integrated in a semiconductor device. For example, the cell 70 is an inverter, an NAND gate, an NOR gate, or a multiplexer etc. The layout of the cell 70 includes metal strips 710, 720, 730 and 740. The metal strips 710, 720, 730 and 740 extend in x direction. In this embodiment, each of the metal strips 710 and 720 is directed to a voltage source. For example, the metal strip 710 is directed to a reference voltage source VDD 711, and the metal strip 720 is directed to a ground voltage 721. Moreover, one of the metal strips 730 and 740 is directed to a clock signal, while the other is directed to another clock signal or an input/output signal, or is an interconnection line. In some embodiments, the metal strip 730 is directed to a first clock signal 731 while the metal strip 740 is directed to a second block signal 741, wherein the first clock signal 731 and the second clock signal 741 are complementary. In some embodiments, the second clock signal 741 is generated by inverting the first clock signal 731.

The cell 70 further includes block strips 750, 760, and 770 parallel with the metal strips 730 and 740, wherein each of the block strips 750, 760, and 770 are indicative of a blockage. Specifically, when a routing tool receives the layout of the cell 70, the block strips 750, 760, and 770 prevent the routing tool from placing another metal strip on the locations of the block strips 750, 760, and 770.

Those skilled in the art should readily understand how the routing tool places the metal strips after reading the aforementioned embodiments. The detailed description is omitted here for brevity.

Figure 8:
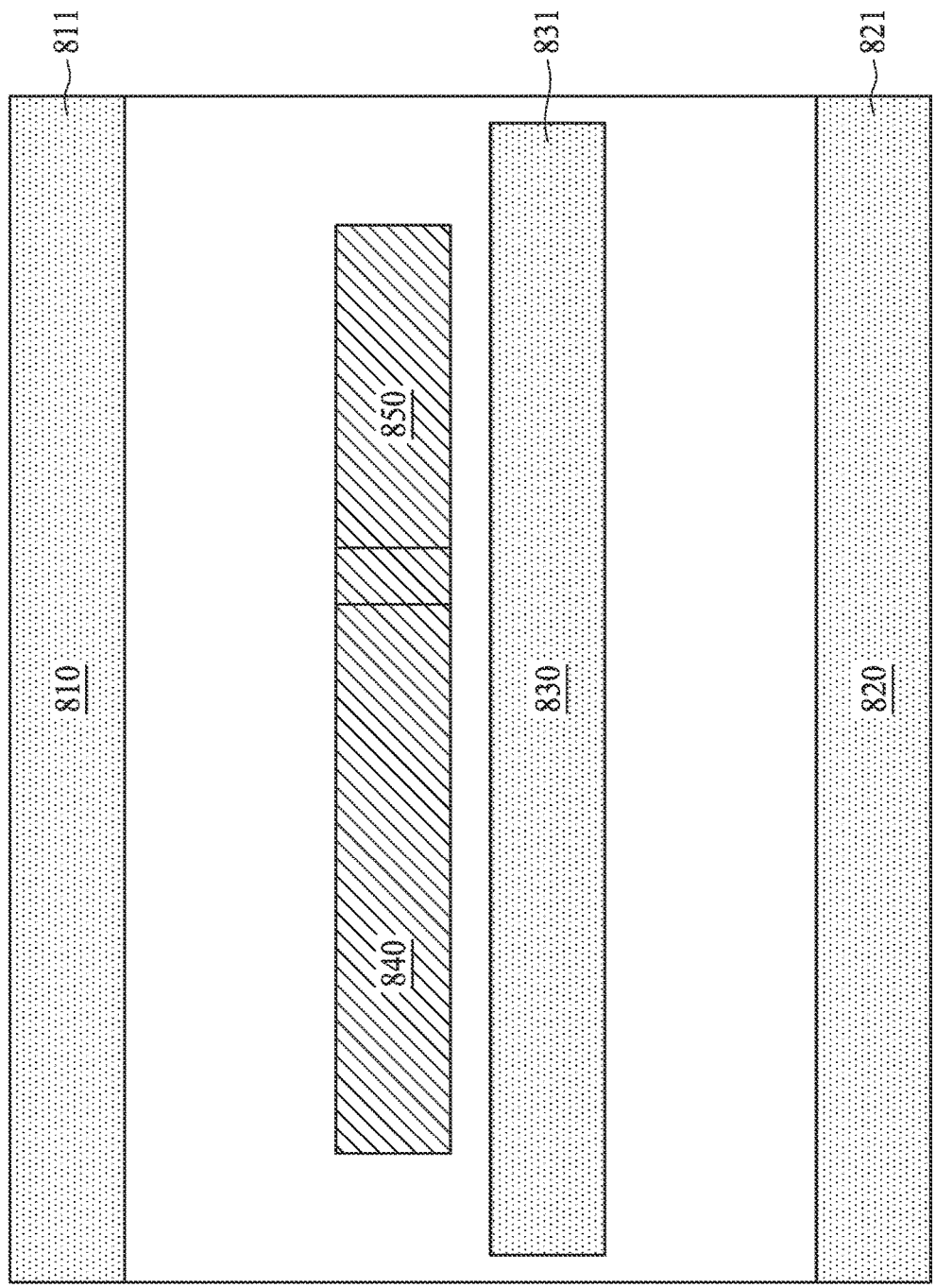
FIG. 8 is a diagram illustrating a cell in accordance with another embodiment of the present disclosure.

FIG. 8 is a diagram illustrating a layout of a cell 80 in accordance with an embodiment of the present disclosure. In this embodiment, the cell 80 is a standard cell integrated in a semiconductor device. For example, the cell 80 is an inverter, an NAND gate, an NOR gate, or a multiplexer etc. The layout of the cell 80 includes metal strips 810, 820, and 830. The metal strips 810, 820, and 830 extend in x direction. In this embodiment, each of the metal strips 810 and 820 is directed to a voltage source. For example, the metal strip 810 is directed to a reference voltage source VDD 811, and the metal strip 820 is directed to a ground voltage 821. The metal strip 830 is directed to a clock signal 831.

The cell 80 further includes block strips 840 and 850 parallel with the metal strip 830, wherein each of the block strips 840 and 850 are indicative of a blockage. Specifically, when a routing tool receives the layout of the cell 80, the block strips 840 and 850 prevent the routing tool from placing another metal strip on the location of the block strips 840 and 850. In this embodiment, the block strip 840 and 850 are located on the same side of the metal strip 830, and the block strips 840 and 850 may extend in x direction and at the same horizontal position, wherein the extension of the block strip 840 overlap the block strip 850.

Figure 9:
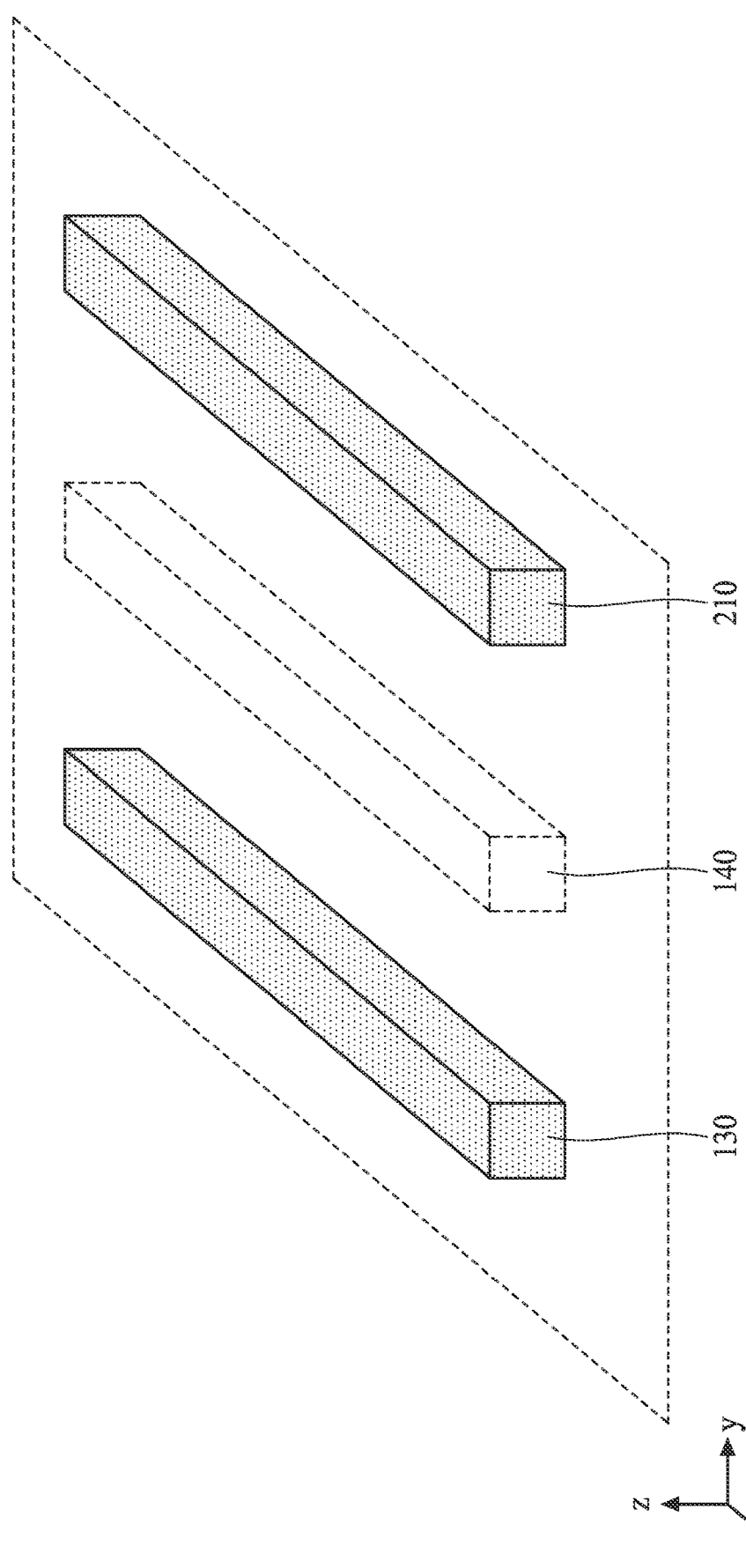
FIG. 9 is a diagram illustrating the metal strip and the block strip located on the same plane in accordance with an embodiment of the present disclosure.

It should be noted that the block strips mentioned above are located in the same layer as the metal strips. With such configurations, the blockages represented by the block strips are located in the same layer as the metal strips. Taking the block strip 140 and the metal strips 130 and 210 for example, in FIG. 9, the blockage represented by the block strip 140 is located in the same layer as the metal strip 130. That is, the blockage represented by the block strip 140 and the metal strip 130 are co-planar. Therefore, the routing tool places the metal strip 210 farther away from the metal strip 130 in y direction as the connection line connecting cells, and the metal strip 210, the metal strip 130 and the block strip 140 are co-planar.

However, this is not a limitation of the present disclosure. In other embodiments, the blockages represented by the block strips are located in the different layer from the metal strips, which presents the routing tool from placing the metal strips on the location of the block strips.

Figure 10A:
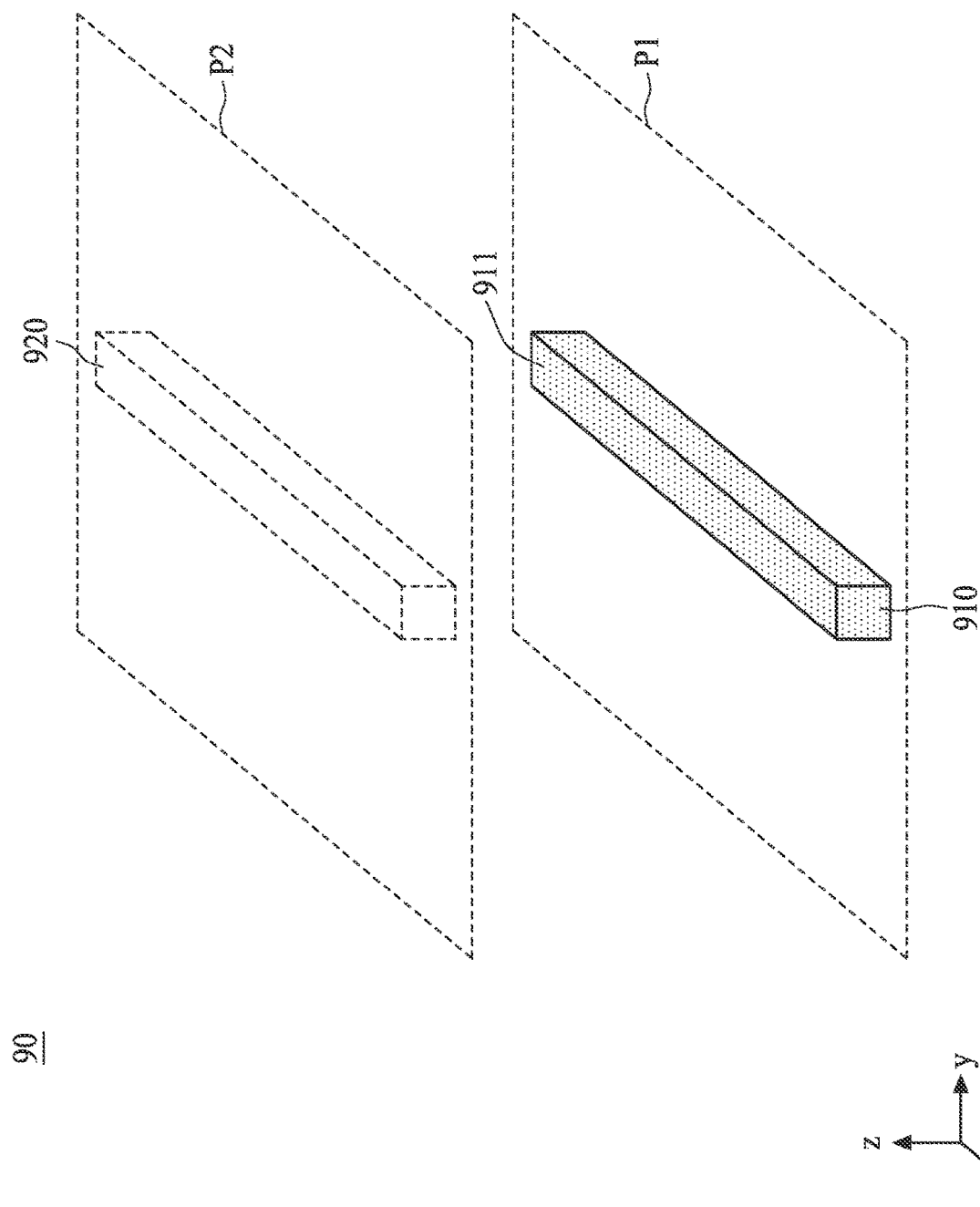
FIG. 10A is a diagram illustrating a cell in accordance with another embodiment of the present disclosure.

FIG. 10A is a diagram illustrating a layout of a cell 90 after the routing stage in accordance with an embodiment of the present disclosure. In this embodiment, the cell 90 is a standard cell integrated in a semiconductor device. For example, the cell 90 is an inverter, an NAND gate, an NOR gate, or a multiplexer etc. The layout of the cell 70 includes a metal strip 910 extending in x direction for carrying a clock signal 911.

The cell 90 further includes a block strip 920 parallel with the metal strip 910, wherein the block strip 920 is indicative of a blockage, which prevents the routing tool from placing a metals strip on the location of the block strip 920.

In this embodiment, the metal strip 910 is located on a plane P1 which is indicative of the M1 layer, and the block strip 920 is located on a plane P2 which is indicative of a M3 layer. The block strip 920 located on the plane P2 is disposed right above the metal strip 910 located on the plane P1.

Figure 10B:
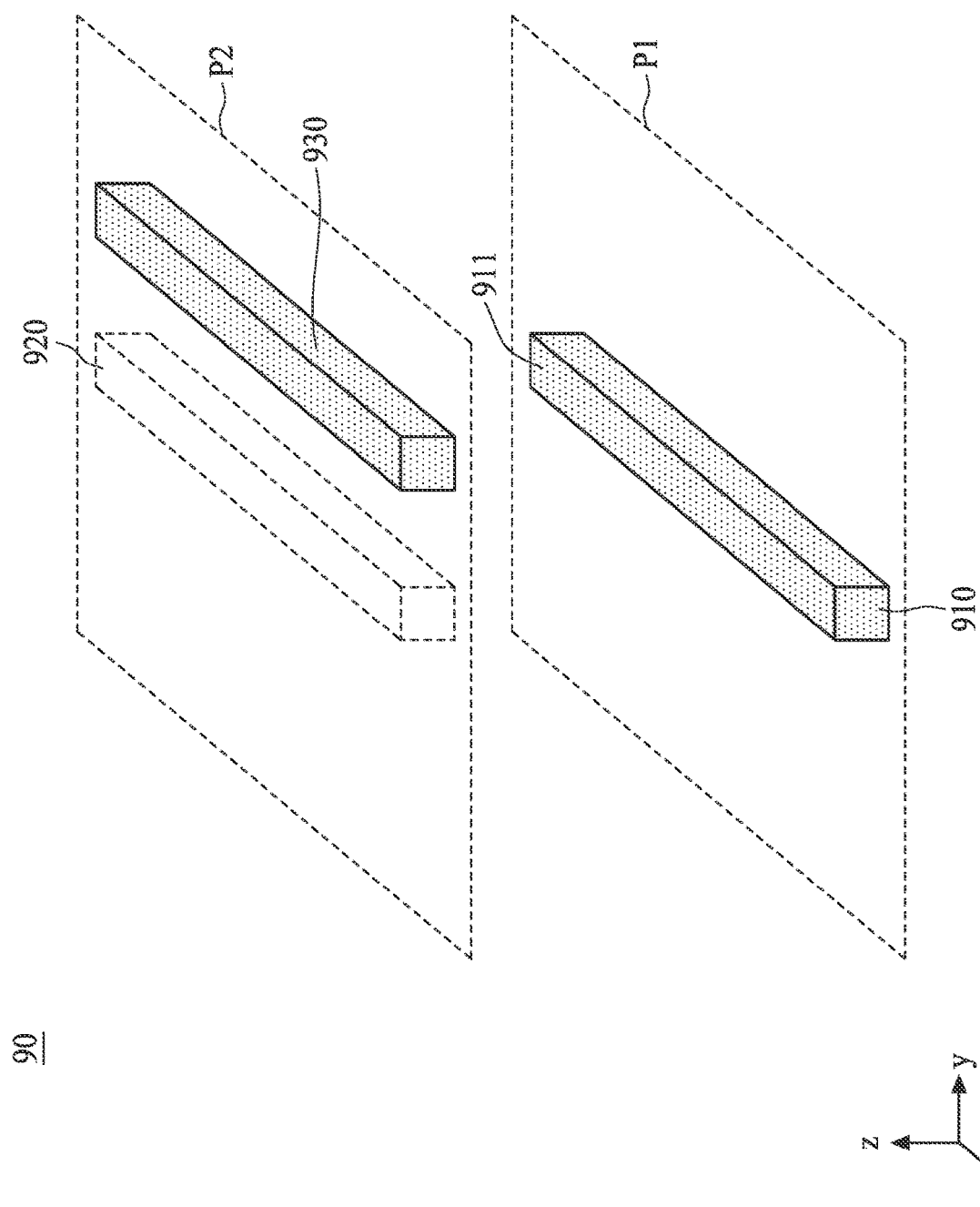
FIG. 10B is a diagram illustrating the cell after the routing stage in accordance with another embodiment of the present disclosure.

Refer to FIG. 10B, which is a diagram illustrating the layout of the cell 90 after the routing stage in accordance with an embodiment of the present disclosure. As shown in FIG. 10B, when the routing tool receives the layout of the cell 90, the routing tool places the metal strips without placing any on the location of the block strip 920. For example, the routing tool places a metal strip 930 beside the block strip 920 on the plane P2. Instead of being placed right above the metal strip 910, the metal strip 930 is placed besides the location right above the metal strip 910, the capacitor formed between the metal strips 910 and 930 is shrunk, the coupling effect is reduced, and the noise resulting from the coupling effect decreased.

In the aforementioned embodiments, the metal strip directed to the clock signals (e.g., the metal strips 130, 330, 530, 730, 830) and the block strips (e.g., the block strips 140, 340, 350, 5401, 5402, 750, 760, 770, 840, 850) are parallel with the metal strips directed to voltage sources (e.g., the metal strips 110, 120, 310, 320, 510, 520, 710, 720, 810, 820). However, this is not a limitation of the present disclosure.

Figure 11:
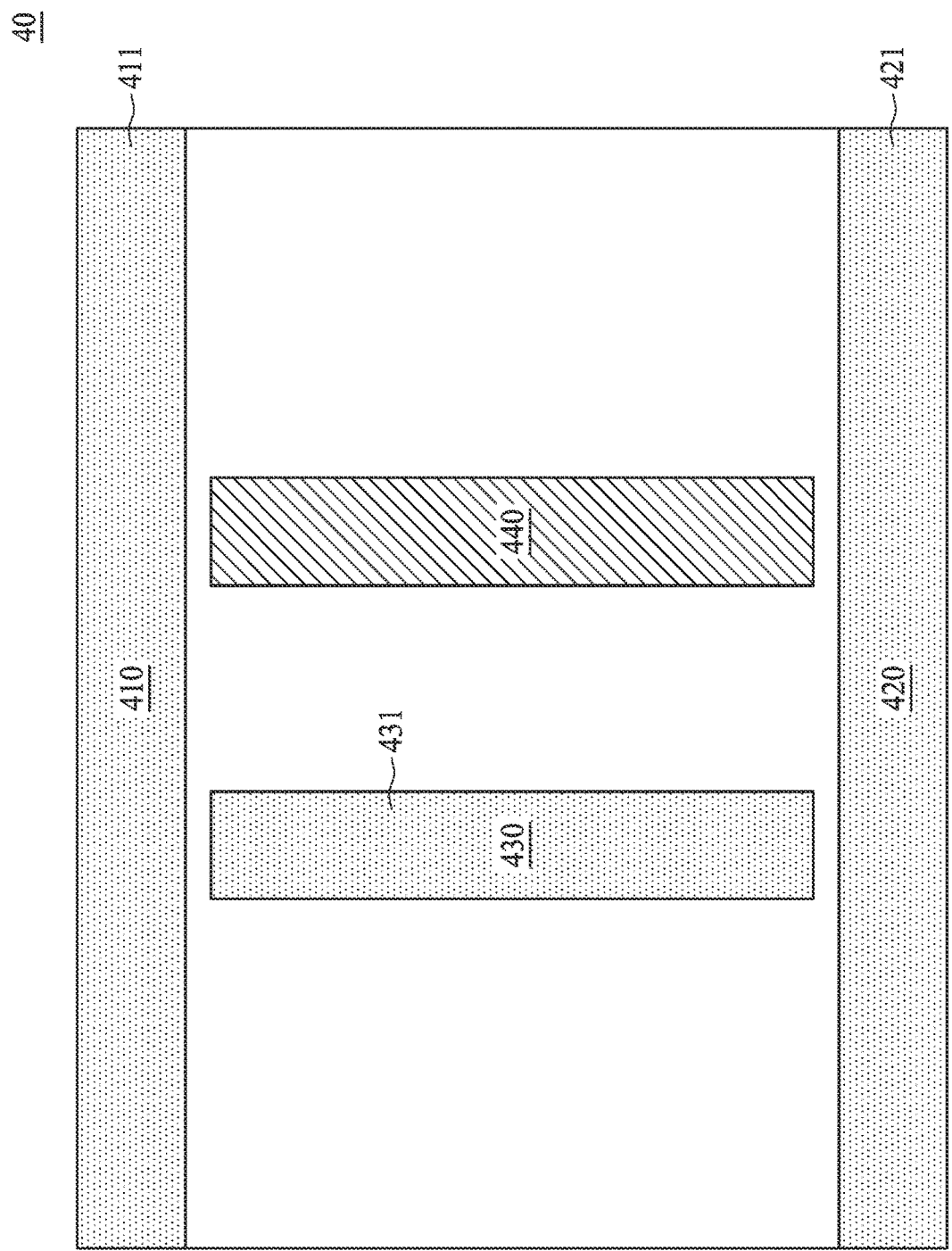
FIG. 11 is a diagram illustrating a cell in accordance with another embodiment of the present disclosure.

FIG. 11 is a diagram illustrating a layout of the cell 40 in accordance with an embodiment of the present disclosure. In this embodiment, the cell 40 is a standard cell integrated in a semiconductor device. For example, the cell 70 is an inverter, an NAND gate, an NOR gate, or a multiplexer etc. The layout of the cell 40 includes metal strips 410, 420, and 430. The metal strips 410 and 420 extend in x direction. In this embodiment, each of the metal strips 410 and 420 is directed to a voltage source. For example, the metal strip 410 is directed to a reference voltage source VDD 531, and the metal strip 420 is directed to a ground voltage. The metal strip 430 extending in y direction is directed to a clock signal 431.

The cell 40 further includes a block strip 440 parallel with the metal strip 430, wherein the block strip 440 is indicative of a blockage. Specifically, when a routing tool receives the layout of the cell 40, the block strip 440 prevents the routing tool from placing another metal strip on the location of the block strip 440.

Those skilled in the art should readily understand how the routing tool places the metal strips after reading the aforementioned embodiments. The detailed description is omitted here for brevity.

Figure 12:
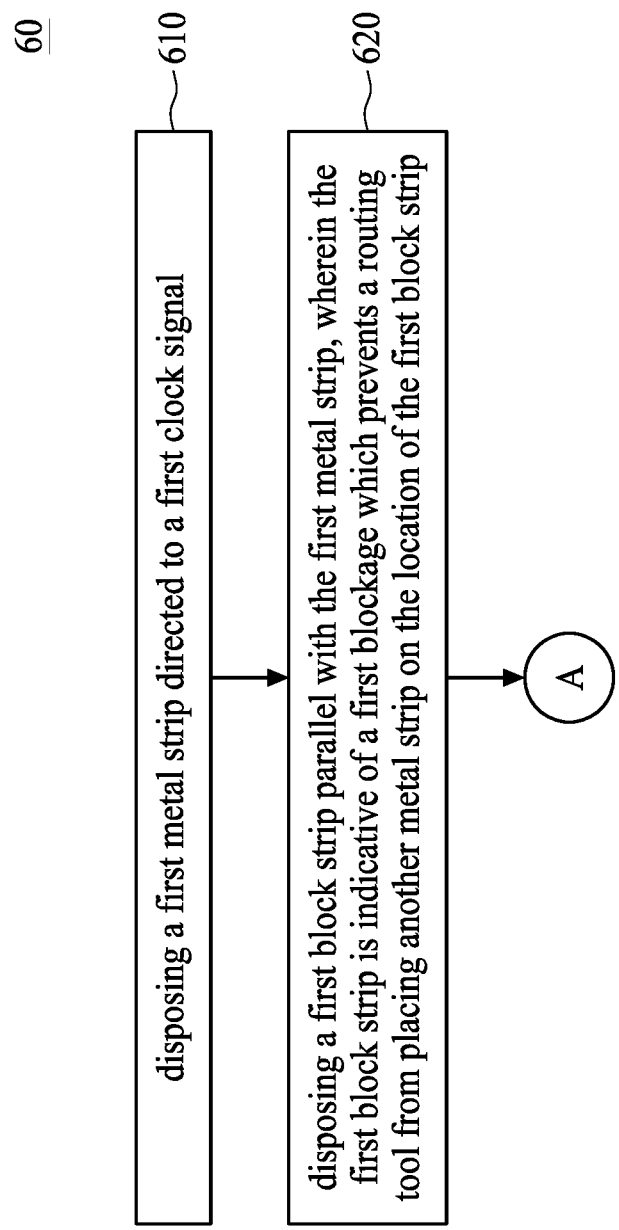
FIG. 12 is a flowchart illustrating a first part of a layout method of a semiconductor device in accordance with an embodiment of the present disclosure.

FIG. 12 is a flowchart illustrating a first part of a layout method 60 of a semiconductor device in accordance with an embodiment of the present disclosure. Provided that the results are substantially the same, the operations shown in FIG. 12 are not required to be executed in the exact order. The first part of the layout method 60 is summarized as follows.

In operation 610, a first metal strip is disposed which is directed to a first clock signal.

In operation 620, a first block strip parallel with the first metal strip is disposed, wherein the first block strip is indicative of a first blockage which prevents a routing tool from placing another metal strip on the location of the first block strip.

Taking FIG. 1 for example, the metal strip 130 directed to the clock signal 131 is disposed as the first metal strip. Moreover, the block strip 140 parallel with the metal strip 130 is disposed, wherein the block strip 140 is indicative of a blockage which prevents the routing tool from placing another metal strip on the location of the block strip 140.

Figure 13:
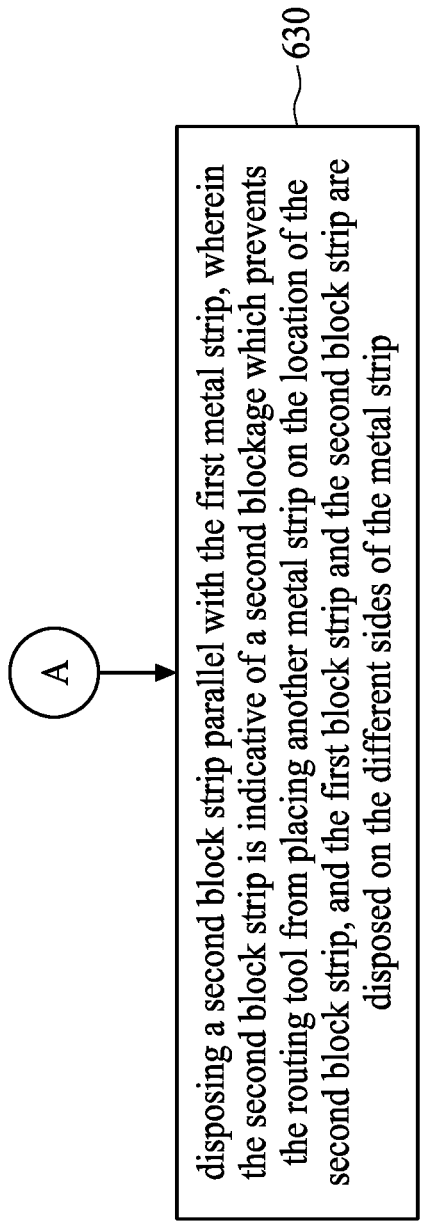
FIG. 13 is a flowchart illustrating a second part of a layout method of a semiconductor device in accordance with an embodiment of the present disclosure.

FIG. 13 is a flowchart illustrating a second part of the layout method 60 of the semiconductor device in accordance with an embodiment of the present disclosure. The second part of the layout method 60 in FIG. 13 follows the first part of the layout method in FIG. 12. The second part of the layout method 60 is summarized as follows.

In operation 630, a second block strip parallel with the first metal strip is disposed, wherein the second block strip is indicative of a second blockage which prevents the routing tool from placing another metal strip on the location of the second block strip, and the first block strip and the second block strip are disposed on the different sides of the metal strip.

Taking FIG. 3 for example, the metal strip 330 is disposed as the first metal strip. Moreover, the block strip 340 parallel with the metal strip 330 is disposed as the first block strip indicative of a blockage which prevents the routing tool from placing another metal strip on the location of the block strip 340. Furthermore, the block strip 350 parallel with the metal strip 330 is disposed as the second block strip indicative of another blockage which prevents the routing tool from placing another metal strip on the location of the block strip 350.

Figure 14:
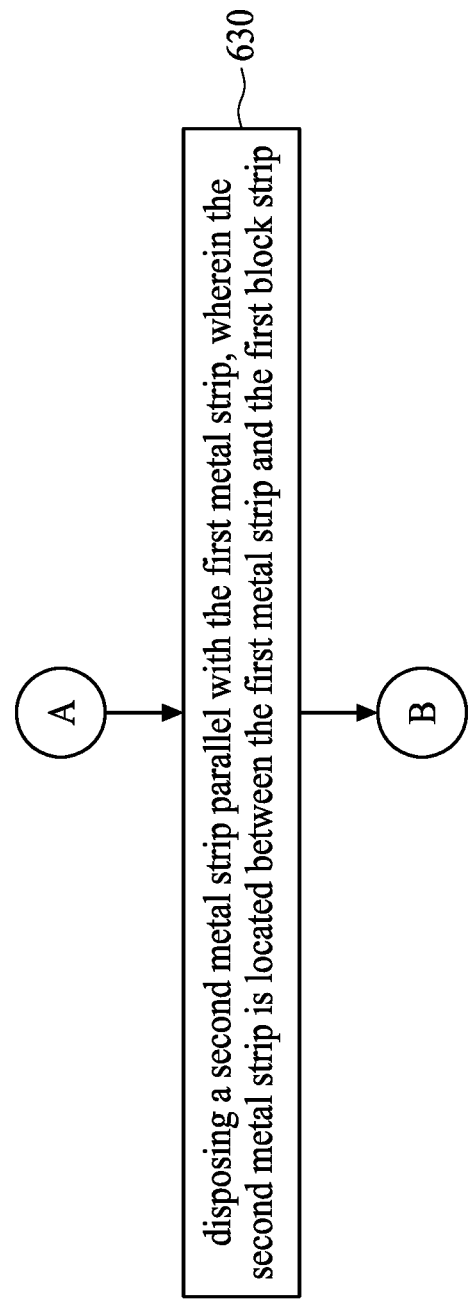
FIG. 14 is a flowchart illustrating a second part of a layout method of a semiconductor device in accordance with another embodiment of the present disclosure.

FIG. 14 is a flowchart illustrating a second part of the layout method 60 of the semiconductor device in accordance with another embodiment of the present disclosure. The second part of the layout method 60 in FIG. 14 follows the first part of the layout method in FIG. 12. The second part of the layout method 60 is summarized as follows.

In operation 630, a second metal strip parallel with the first metal strip is disposed, wherein the second metal strip is located between the first metal strip and the first block strip.

Taking FIG. 5 for example, the metal strip 550 directed to the clock signal 551 is disposed as the first metal strip. Moreover, the block strip 5401 parallel with the metal strip 550 is disposed as the first block strip indicative of a blockage which prevents the routing tool from placing another metal strip on the location of the block strip 5401.

Furthermore, the metal strip 530 parallel with the metal strip 550 is disposed as the second metal strip. The metal strip 530 is located between the metal strip 550 and the block strip 5401.

Figure 15:
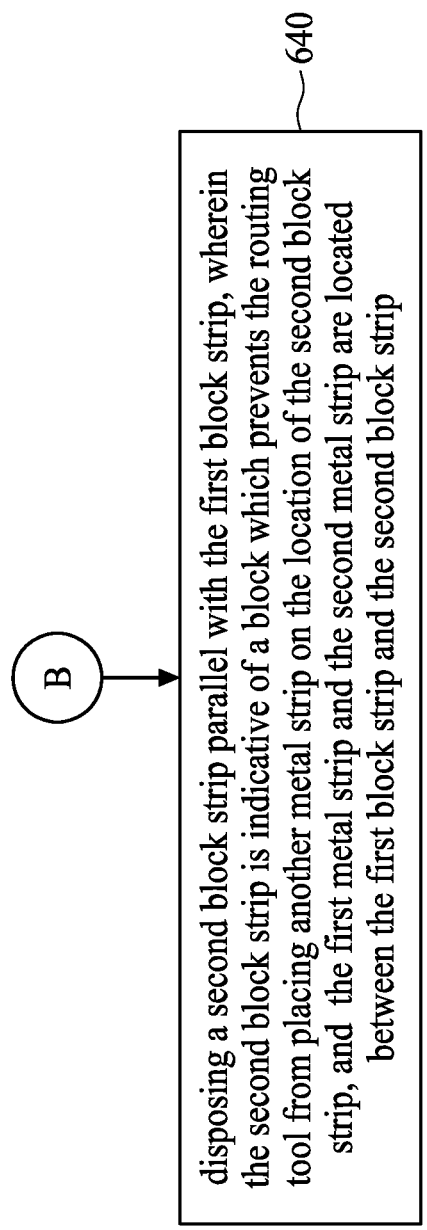
FIG. 15 is a flowchart illustrating a third part of a layout method of a semiconductor device in accordance with an embodiment of the present disclosure.

FIG. 15 is a flowchart illustrating a third part of the layout method 60 of the semiconductor device in accordance with another embodiment of the present disclosure. The third part of the layout method 60 in FIG. 15 follows the second part of the layout method in FIG. 14. The third part of the layout method 60 is summarized as follows.

In operation 640, a second block strip parallel with the first block strip is disposed, wherein the second block strip is indicative of a block which prevents the routing tool from placing another metal strip on the location of the second block strip, and the first metal strip and the second metal strip are located between the first block strip and the second block strip.

Taking FIG. 7 for example, the metal strip 730 directed to a clock signal 731 is disposed as the first metal strip. Moreover, the block strip 750 parallel with the metal strip 730 is disposed as the first block strip, wherein the block strip 750 is indicative of a blockage which prevents the routing tool from placing another metal strip on the location of the block strip 750. Furthermore, the metal strip 740 parallel with the metal strip 730 is disposed as the second metal strip. In addition, the block strip 760 parallel with the metal strips 730 and 740 is disposed as the second block strip, wherein the block strip 760 is indicative of a blockage which prevents the routing tool from placing another metal strip on the location of the block strip 760. The metal strips 730 and 740 are located between the block strips 750 and 760.

Figure 16:
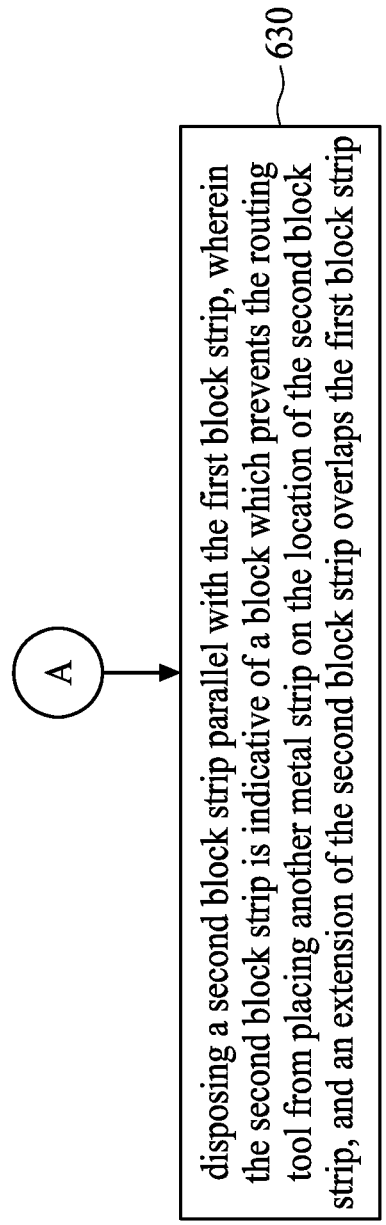
FIG. 16 is a flowchart illustrating a second part of a layout method of a semiconductor device in accordance with another embodiment of the present disclosure.

FIG. 16 is a flowchart illustrating a second part of the layout method 60 of the semiconductor device in accordance with yet another embodiment of the present disclosure. The second part of the layout method 60 in FIG. 16 follows the first part of the layout method in FIG. 12. The second part of the layout method 60 is summarized as follows.

In operation 630, a second block strip parallel with the first block strip is disposed, wherein the second block strip is indicative of a block which prevents the outing tool from placing another metal strip on the location of the second block strip, and an extension of the second block strip overlaps the first block strip.

Taking FIG. 8 for example, the metal strip 830 directed to the clock signal 831 is disposed as the first metal strip. Moreover, the block strip 840 parallel with the metal strip 830 is disposed as the first block strip, wherein the block strip 840 is indicative of a blockage, which prevents the routing tool from placing another metal strip on the location of the block strip 840. Furthermore, the block strip 850 parallel with the metal strip 850 is disposed as the second block strip, wherein the block strip 850 is indicative of a blockage, which prevents the routing tool from placing another metal strip on the location of the block strip 850. The block strips 840 and 850 may extend in x direction and at the same horizontal position. The extension of the block strip 840 overlaps the block strip 850.

Figure 17:
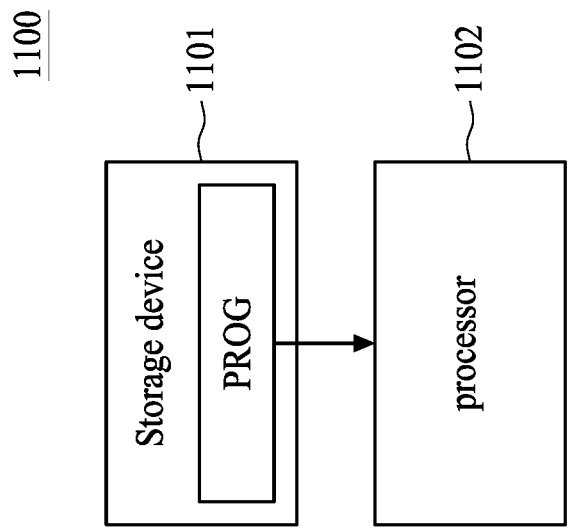
FIG. 17 is a diagram illustrating a system in accordance with another embodiment of the present disclosure.

FIG. 17 is a diagram illustrating a system 1100 in accordance with an embodiment of the present disclosure. The system 1100 includes a storage device 1101 arranged to store a program code PROG, and a processor 1102. When loaded and executed by the processor 1102, the program code instructs the processor to execute the following operations: disposing a first metal strip directed to a first clock signal; and disposing a first block strip parallel with the first metal strip, wherein the first block strip is indicative of a first blockage which prevents a routing tool from placing another metal strip on the location of the first block strip.

Those skilled in the art readily understand the operation of the system 1100 after reading the embodiments above. The detailed description is omitted here for brevity.

Figure 18:
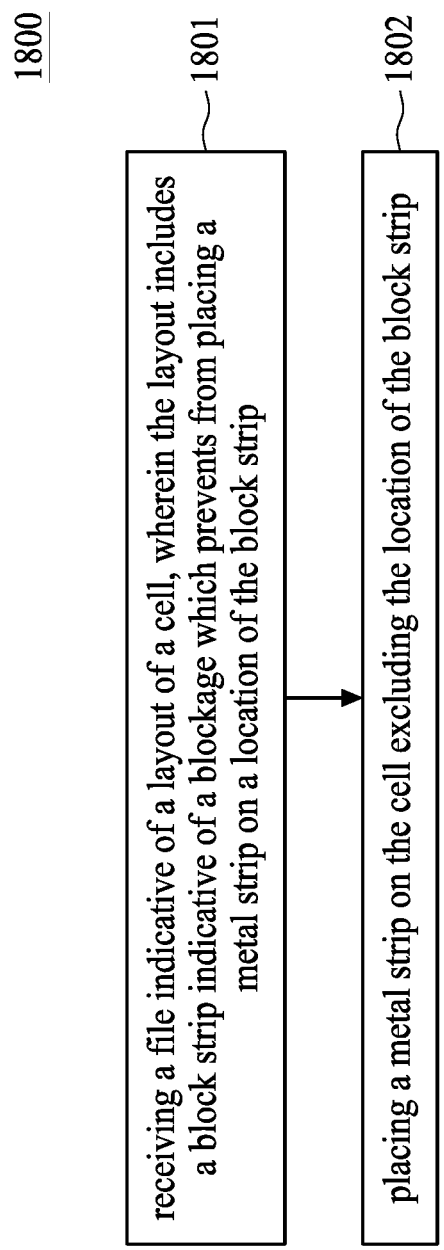
FIG. 18 is a flowchart illustrating a layout method of a semiconductor device in accordance with another embodiment of the present disclosure.

FIG. 18 is a layout method 1800 of a semiconductor device in accordance with an embodiment of the present disclosure. Provided that the results are substantially the same, the operations shown in FIG. 18 are not required to be executed in the exact order. The method 1800 is summarized as follows.

In operation 1801, a file indicative of a layout of a cell is received, wherein the layout includes a block strip indicative of a blockage which prevents from placing a metal strip on a location of the block strip; and In operation 1802, a metal strip on the cell is placed excluding the location of the block strip.

Those skilled in the art readily understand the method 1800 after reading the embodiments above. The detailed description is omitted here for brevity.

In some embodiments, a layout method of a semiconductor device is disposed. The layout method includes: disposing a first metal strip directed to a first clock signal; and disposing a first block strip parallel with the first metal strip, wherein the first block strip is indicative of a first blockage which prevents a routing tool from placing another metal strip on the location of the first block strip.

In some embodiments, a system is disposed. The system includes a storage device arranged to store a program code, and a processor. When loaded and executed by the processor, the program code instructs the processor to execute the following operations: disposing a first metal strip directed to a first clock signal; and disposing a first block strip parallel with the first metal strip, wherein the first block strip is indicative of a first blockage which prevents a routing tool from placing another metal strip on the location of the first block strip.

In some embodiments, a layout method of a semiconductor device is disposed. The layout method includes: receiving a file indicative of a layout of a cell, wherein the layout includes a block strip indicative of a blockage which prevents from placing a metal strip on a location of the block strip; and placing a metal strip on the cell excluding the location of the block strip.

What is claimed is:

1. A layout method of a semiconductor device, comprising:
   disposing a first metal strip directed to a first clock signal;
   disposing a first block strip parallel with the first metal strip, wherein the first block strip is indicative of a first blockage which prevents a routing tool from placing another metal strip on the location of the first block strip; and
   disposing a second metal strip directed to a second clock signal different than the first clock signal, wherein the second metal strip is parallel with the first block strip, the first block strip is located between the first metal strip and the second metal strip, and edges of the first block strip being substantially aligned with edges of the first metal strip.

2. The layout method of claim 1, further comprising:
   disposing a second block strip parallel with the first metal strip, wherein the second block strip is indicative of a second blockage which prevents the routing tool from placing another metal strip on the location of the second block strip;

wherein the first block strip and the second block strip are disposed on the different sides of the first metal strip.

3. The layout method of claim 2, further comprising:
disposing a third block strip parallel with the first block strip, wherein the third block strip is indicative of a third blockage which prevents the routing tool from placing another metal strip on the location of the second block strip;
wherein the first metal strip and the second metal strip are located between the second block strip and the third block strip.

4. The layout method of claim 1, wherein the second metal strip is parallel with the first metal strip.

5. The layout method of claim 1, wherein the first clock signal and the second clock signal are complementary.

6. The layout method of claim 1, wherein the first block strip and the first metal strip are co-planar.

7. The layout method of claim 1, wherein the first block strip is disposed above the first metal strip.

8. The layout method of claim 1, wherein the first metal strip and the first block strip are parallel with a signal line directed to a voltage source.

9. The layout method of claim 1, wherein the first metal strip and the first block strip are orthogonal with a signal line directed to a voltage source.

10. The layout method of claim 1, further comprising:
disposing a second block strip parallel with the first block strip, wherein the second block strip is indicative of a block which prevents the routing tool from placing another metal strip on the location of the second block strip;
wherein the second block strip is spaced apart from the first block strip.

11. A system, comprising:
a storage device, arranged to store a program code;
a processor, when loaded and executed by the processor, the program code instructs the processor to execute following operations:
disposing a first metal strip directed to a first clock signal;
disposing a first block strip parallel with the first metal strip, wherein the first block strip is indicative of a first blockage which prevents a routing tool from placing another metal strip on the location of the first block strip; and
disposing a second metal strip directed to a second clock signal different than the first clock signal, wherein the second metal strip is parallel with the first block strip, the first block strip is located between the first metal strip and the second metal strip, and an edge of the first block strip being substantially aligned with an edge of the first metal strip and an edge of the second metal strip.

12. The system of claim 11, wherein the program code further instructs the processor to execute following operations:
disposing a second block strip parallel with the first metal strip, wherein the second block strip is indicative of a second blockage which prevents the routing tool from placing another metal strip on the location of the second block strip;
wherein the first block strip and the second block strip are disposed on the different sides of the first metal strip.

13. The system of claim 12, wherein
the second metal strip is parallel with the first metal strip; and
wherein the first clock signal and the second clock signal are complementary.

14. The system of claim 12, wherein the program code further instructs the processor to execute following operations:
disposing a third block strip parallel with the first block strip, wherein the second block strip is indicative of a third blockage which prevents the routing tool from placing another metal strip on the location of the second block strip;
wherein the first metal strip and the second metal strip are located between the second block strip and the third block strip.

15. The system of claim 11, wherein the first block strip and the first metal strip are co-planar.

16. The system of claim 11, wherein the first block strip is disposed above the first metal strip.

17. The system of claim 11, wherein the first metal strip and the first block strip are parallel with a signal line directed to a voltage source.

18. The system of claim 11, wherein the first metal strip and the first block strip are orthogonal with a signal line directed to a voltage source.

19. The system of claim 11, wherein the program code further instructs the processor to execute following operations:
disposing a second block strip parallel with the first block strip, wherein the second block strip is indicative of a second blockage which prevents the routing tool from placing another metal strip on the location of the second block strip;
wherein the second block strip is spaced apart from the first block strip.

20. A layout method of a semiconductor device, comprising:
receiving a file indicative of a layout of a cell, wherein the layout includes a block strip indicative of a blockage which prevents from placing a metal strip on a location of the block strip;
placing a first metal strip on the cell on a first side of the block strip; and
disposing a second metal strip on a second side of the block strip, wherein
the first metal strip directed to a first clock signal and the second metal strip directed to a second clock signal different than the first clock signal, and
a total length of the block strip being substantially identical to those of the first metal strip and the second metal strip.

* * * * *